US009895945B2

(12) United States Patent
Lavoie

(10) Patent No.: US 9,895,945 B2
(45) Date of Patent: Feb. 20, 2018

(54) TRAILER BACKUP ASSIST SYSTEM WITH HITCH ASSIST

(71) Applicant: Ford Global Technologies, LLC, Dearborn, MI (US)

(72) Inventor: Erick Michael Lavoie, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 217 days.

(21) Appl. No.: 14/962,772

(22) Filed: Dec. 8, 2015

(65) Prior Publication Data

US 2017/0158007 A1 Jun. 8, 2017

(51) Int. Cl.

| | |
|---|---|
| ***B60D 1/36*** | (2006.01) |
| ***B60D 1/06*** | (2006.01) |
| ***B60W 10/22*** | (2006.01) |
| ***B60W 10/30*** | (2006.01) |
| ***B60W 30/18*** | (2012.01) |
| ***B60D 1/62*** | (2006.01) |
| ***B60D 1/66*** | (2006.01) |
| ***B60T 7/20*** | (2006.01) |

(52) U.S. Cl.

CPC ............... *B60D 1/363* (2013.01); *B60D 1/06* (2013.01); *B60D 1/065* (2013.01); *B60D 1/36* (2013.01); *B60D 1/62* (2013.01); *B60D 1/66* (2013.01); *B60T 7/20* (2013.01); *B60W 10/22* (2013.01); *B60W 10/30* (2013.01); *B60W 30/18009* (2013.01); *B60T 2230/08* (2013.01); *B60W 2710/22* (2013.01); *B60W 2710/30* (2013.01)

(58) Field of Classification Search

CPC combination set(s) only.
See application file for complete search history.

(56) References Cited

U.S. PATENT DOCUMENTS

| | | | |
|---|---|---|---|
| 4,897,642 | A | 1/1990 | DiLullo et al. |
| 5,142,278 | A | 8/1992 | Moallemi et al. |
| 5,282,641 | A | 2/1994 | McLaughlin |
| 5,442,810 | A | 8/1995 | Jenquin |
| 5,905,433 | A | 5/1999 | Wortham |
| 5,919,241 | A | 7/1999 | Bolourchi et al. |
| 5,999,091 | A | 12/1999 | Wortham |
| 6,122,579 | A | 6/2000 | Collier-Hallman et al. |
| 6,111,524 | A | 8/2000 | Lesesky et al. |

(Continued)

FOREIGN PATENT DOCUMENTS

| | | | |
|---|---|---|---|
| CN | 202159367 | U | 3/2012 |
| DE | 102008045436 | A1 | 3/2010 |

(Continued)

OTHER PUBLICATIONS

Skybitz, website, 2012, pp. 1- 3, http://www.skybitz.com/products-services/hardware/bat-xtndr/.

(Continued)

*Primary Examiner* — Richard M Camby

(74) *Attorney, Agent, or Firm* — Raymond Coppiellie; Price Heneveld LLP

(57) ABSTRACT

A hitch assist system is provided herein. An imaging device captures images of a scene rearward of a vehicle. A controller processes captured images and is configured to control a vehicle suspension system to adjust a height of the vehicle and control the deployment of a power tongue jack of a trailer.

14 Claims, 9 Drawing Sheets

10 12 58 82 62 16 44 40 18 42 24 53 44 14 26 42 22 36 28 32 30

(56) References Cited

U.S. PATENT DOCUMENTS 6,142,372 A 11/2000 Wright
6,370,459 B1 4/2002 Phillips
6,424,895 B1 7/2002 Shimizu et al.
6,501,376 B2 12/2002 Dieckmann et al.
6,631,781 B2 10/2003 Williams et al.
6,687,609 B2 2/2004 Hsiao et al.
6,847,916 B1 1/2005 Ying
6,999,856 B2 2/2006 Lee et al.
7,039,504 B2 5/2006 Tanaka et al.
7,136,754 B2 11/2006 Hahn et al.
7,175,194 B2 2/2007 Ball
7,225,891 B2 6/2007 Gehring et al.
7,546,191 B2 6/2009 Lin et al.
7,696,862 B2 4/2010 Herschell et al.
7,706,944 B2 4/2010 Tanaka et al.
7,731,302 B2 6/2010 Tandy, Jr. et al.
7,760,077 B2 7/2010 Day
7,777,615 B2 8/2010 Okuda et al.
7,825,782 B2 11/2010 Hermann
7,932,815 B2 4/2011 Martinez et al.
7,950,751 B2 5/2011 Offerle et al.
8,010,252 B2 8/2011 Getman et al.
8,020,657 B2 9/2011 Allard et al.
8,068,019 B2 11/2011 Bennie et al.
8,139,109 B2 3/2012 Schmiedel et al.
8,165,770 B2 4/2012 Getman et al.
8,169,341 B2 5/2012 Toledo et al.
8,179,238 B2 5/2012 Roberts, Sr. et al.
8,223,204 B2 7/2012 Hahn
8,224,078 B2 7/2012 Boncyk et al.
8,290,657 B2 10/2012 Lavoie
8,362,888 B2 1/2013 Roberts, Sr. et al.
8,374,749 B2 2/2013 Tanaka
8,406,956 B2 3/2013 Wey et al.
8,464,829 B2 6/2013 Von Tardy-Tuch et al.
8,498,770 B2 7/2013 Takano
8,521,364 B2 8/2013 Hueger et al.
8,571,758 B2 10/2013 Klier et al.
8,645,015 B2 2/2014 Oetiker et al.
8,823,796 B2 9/2014 Shen et al.
8,825,221 B2 9/2014 Hueger et al.
8,930,140 B2 1/2015 Trombley et al.
8,948,990 B2 2/2015 Kobayashi et al.
8,957,786 B2 2/2015 Stempnik et al.
9,008,913 B1 4/2015 Sears et al.
9,102,271 B2 8/2015 Trombley et al.
9,132,856 B2 9/2015 Shepard
9,156,496 B2 10/2015 Greenwood et al.
9,174,672 B2 11/2015 Zeng et al.
9,227,474 B2 1/2016 Liu
9,229,453 B1 1/2016 Lee
9,238,483 B2 1/2016 Hafner et al.
9,315,212 B1 4/2016 Kyrtsos et al.
9,335,162 B2 5/2016 Kyrtsos et al.
9,352,777 B2 5/2016 Lavoie et al.
9,400,897 B2 7/2016 Bruening et al.
9,429,943 B2 8/2016 Wilson et al.
9,464,913 B2 10/2016 Brown et al.
9,520,063 B2 12/2016 Noh
2005/0071373 A1 3/2005 Long
2006/0190147 A1 8/2006 Lee et al.
2007/0057816 A1 3/2007 Sakakibara et al.
2007/0058273 A1 3/2007 Ito et al.
2007/0271267 A1 11/2007 Lim et al.
2008/0231701 A1 9/2008 Greenwood et al.
2009/0045924 A1 2/2009 Roberts, Sr. et al.
2009/0093928 A1 4/2009 Getman et al.
2009/0219147 A1 9/2009 Bradley et al.
2009/0222202 A1 9/2009 Kato
2009/0271078 A1 10/2009 Dickinson
2010/0156667 A1 6/2010 Bennie et al.
2011/0001825 A1 1/2011 Hahn
2011/0216149 A1* 9/2011 Masuda .................. B41J 2/325 347/218
2011/0257860 A1 10/2011 Getman et al.
2011/0281522 A1 11/2011 Suda
2012/0200706 A1 8/2012 Greenwood et al.
2012/0283909 A1 11/2012 Dix
2012/0316732 A1 12/2012 Auer
2013/0006472 A1 1/2013 McClain et al.
2013/0027195 A1 1/2013 Van Wiemeersch et al.
2013/0041524 A1 2/2013 Brey
2013/0103246 A1 4/2013 Staack
2013/0120161 A1 5/2013 Wakabayashi et al.
2013/0148748 A1 6/2013 Suda
2013/0229524 A1 9/2013 Vovkushevsky et al.
2013/0238193 A1 9/2013 Bolourchi et al.
2013/0253814 A1 9/2013 Wirthlin
2013/0261843 A1 10/2013 Kossira et al.
2014/0005918 A1 1/2014 Qiang
2014/0052337 A1 2/2014 Lavoie et al.
2014/0058614 A1 2/2014 Trombley et al.
2014/0058622 A1 2/2014 Trombley et al.
2014/0058655 A1 2/2014 Trombley et al.
2014/0058668 A1 2/2014 Trombley et al.
2014/0085472 A1 3/2014 Lu et al.
2014/0121883 A1 5/2014 Shen et al.
2014/0121930 A1 5/2014 Allexi et al.
2014/0160276 A1 6/2014 Pliefke et al.
2014/0172232 A1 6/2014 Rupp et al.
2014/0188344 A1 7/2014 Lavoie
2014/0188346 A1 7/2014 Lavoie
2014/0210456 A1 7/2014 Crossman
2014/0218506 A1 8/2014 Trombley et al.
2014/0218522 A1 8/2014 Lavoie et al.
2014/0236532 A1 8/2014 Trombley et al.
2014/0249691 A1 9/2014 Hafner et al.
2014/0267688 A1 9/2014 Aich et al.
2014/0267689 A1 9/2014 Lavoie
2014/0267868 A1 9/2014 Mazzola et al.
2014/0267869 A1 9/2014 Sawa
2014/0277942 A1 9/2014 Kyrtsos et al.
2014/0297128 A1 10/2014 Lavoie et al.
2014/0303847 A1 10/2014 Lavoie
2014/0309888 A1 10/2014 Smit et al.
2014/0324295 A1 10/2014 Lavoie
2014/0379217 A1 12/2014 Rupp et al.
2015/0002669 A1 1/2015 Reed et al.
2015/0002670 A1 1/2015 Bajpai
2015/0012202 A1 1/2015 Moore et al.
2015/0025732 A1 1/2015 Min et al.
2015/0057903 A1 2/2015 Rhode et al.
2015/0066296 A1 3/2015 Trombley et al.
2015/0077557 A1 3/2015 Han et al.
2015/0120141 A1 4/2015 Lavoie et al.
2015/0134183 A1 5/2015 Lavoie et al.
2015/0137483 A1* 5/2015 Morga .................. B60D 1/246 280/477
2015/0138340 A1 5/2015 Lavoie
2015/0158524 A1 6/2015 Lee et al.
2015/0158527 A1 6/2015 Hafner et al.
2015/0191200 A1 7/2015 Tsubaki et al.
2015/0203156 A1 7/2015 Hafner et al.
2015/0210317 A1 7/2015 Hafner et al.
2015/0251602 A1 9/2015 Baur et al.
2015/0274202 A1 10/2015 Tsunoda et al.
2015/0369613 A1 12/2015 Stadler
2016/0059780 A1 3/2016 Lavoie
2016/0152263 A1 6/2016 Singh et al.
2016/0153778 A1 6/2016 Singh et al.
2016/0207526 A1 7/2016 Franz et al.
2016/0229452 A1 8/2016 Lavoie et al.
2016/0280267 A1 9/2016 Lavoie et al.
2016/0304088 A1 10/2016 Barth
2016/0304122 A1 10/2016 Herzog et al.
2016/0320477 A1 11/2016 Heimberger

FOREIGN PATENT DOCUMENTS

EP 0842841 B1 5/2002
EP 1312492 A2 5/2003
EP 1006042 B1 4/2006
EP 2213546 A1 8/2010
GB 2496298 A 5/2013

(56) References Cited

FOREIGN PATENT DOCUMENTS

| | | | |
|---|---|---|---|
| JP | 649063 | A | 1/1989 |
| JP | 2002337717 | A | 11/2002 |
| JP | 2003261053 | A | 9/2003 |
| JP | 2009113512 | A | 5/2009 |
| KR | 20110114897 | A | 4/2010 |
| KR | 1020140004411 | A | 1/2014 |
| KR | 1020150038776 | A | 4/2015 |
| WO | 2014123575 | A1 | 8/2014 |

OTHER PUBLICATIONS

Verma, V.S.; Guntur, R.R.; Womg, J.Y.; "Directional Behavior During Braking of a Tractor/Semitrailer", TRID, International Journal of Vehicle Design, May 1980, pp. 195-220, vol. 1, No. 3, Inderscience Enterprises Limited, ISSN: 1477-5360.

* cited by examiner

TRAILER BACKUP ASSIST SYSTEM WITH HITCH ASSIST

FIELD OF THE INVENTION

The present invention generally relates to trailer backup assist systems, and more particularly, to trailer backup assist systems employing hitch assist functionality.

BACKGROUND OF THE INVENTION

Making or removing a hitch connection between a vehicle and a trailer can be time consuming and difficult, especially for those who are inexperienced. As such, there is a need for a system that assists a user in the hitching and unhitching of a vehicle to and from a trailer.

SUMMARY OF THE INVENTION

According to one aspect of the present invention, a hitch assist system is provided. An imaging device captures images of a scene rearward of a vehicle. A controller processes captured images and is configured to control a vehicle suspension system to adjust a height of the vehicle and control the deployment of a power tongue jack of a trailer.

According to another aspect of the present invention, a method of hitching a vehicle to a trailer is provided. A controller is provided and is configured to autonomously back the vehicle toward the trailer, control a vehicle suspension system to adjust a height of the vehicle such that a hitch connection can be made between a hitch ball and a coupler ball socket, and control a power tongue jack of the trailer to move between a deployed position and a retracted position.

According to yet another aspect of the present invention, a method of unhitching a vehicle from a trailer is provided. A controller is provided and is configured to control a vehicle suspension system to adjust a height of the vehicle such that a hitch ball can become unhitched from a coupler ball socket and control a power tongue jack of the trailer to move between a retracted position and a deployed position.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

For purposes of description herein, it is to be understood that the disclosed trailer backup assist system and the related methods may assume various alternative embodiments and orientations, except where expressly specified to the contrary. It is also to be understood that the specific devices and processes illustrated in the attached drawings, and described in the following specification, are simply exemplary embodiments of the inventive concepts defined in the appended claims. While various aspects of the trailer backup assist system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
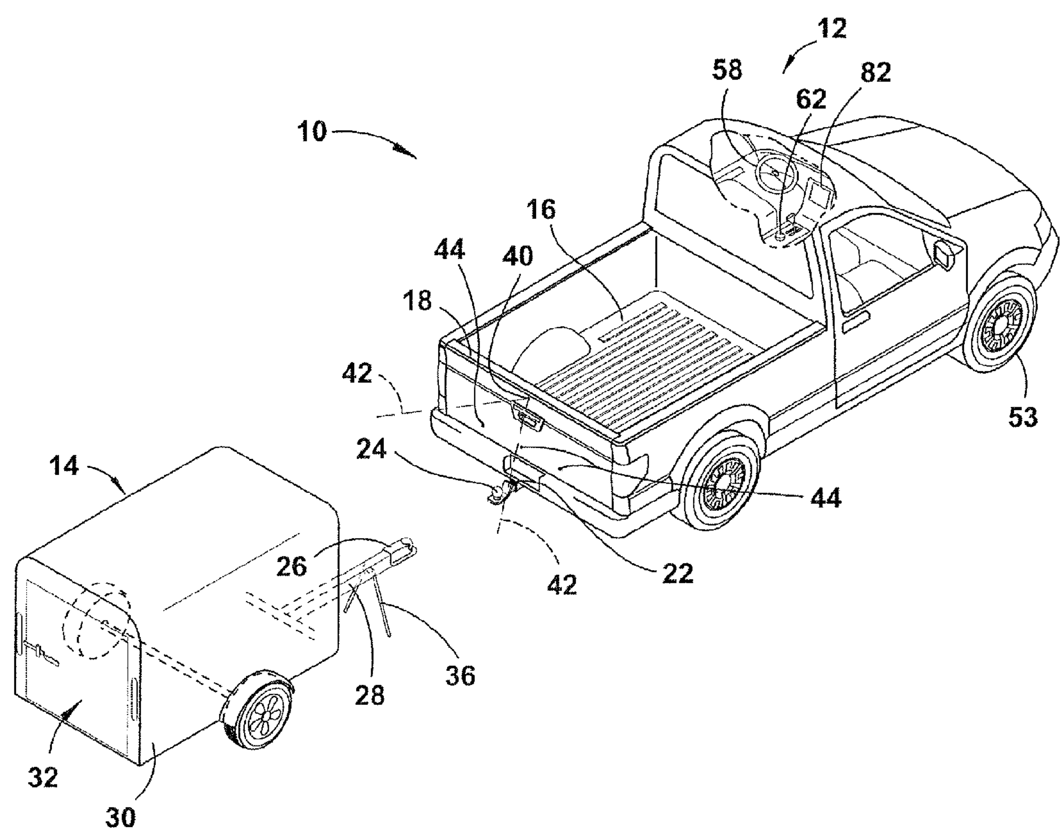
FIG. 1 is a top perspective view of a vehicle and a trailer in an unhitched position.
Figure 2:
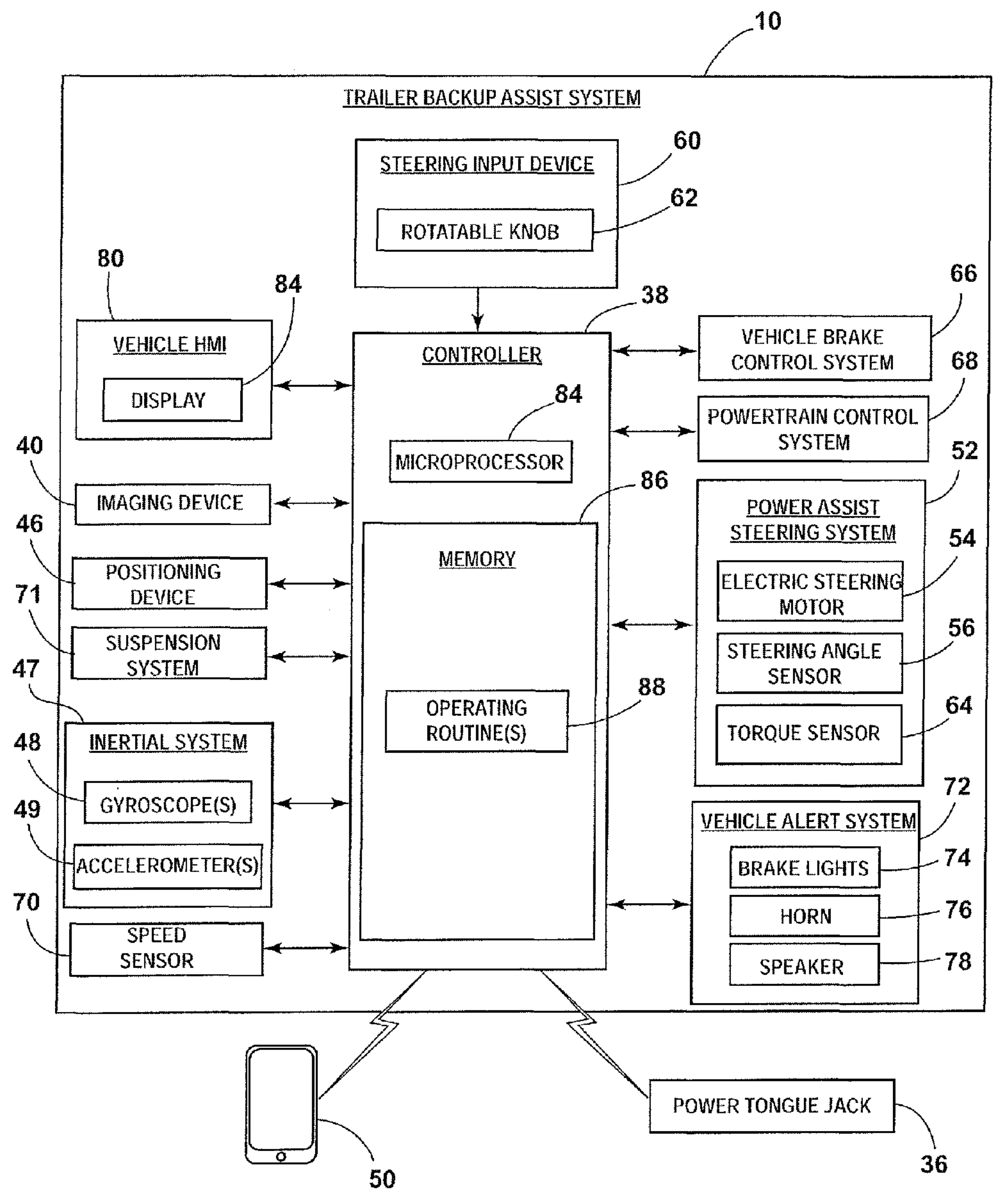
FIG. 2 is a block diagram illustrating one embodiment of a trailer backup assist system.

Referring to FIGS. 1 and 2, reference numeral 10 generally designates a trailer backup assist system capable of aligning a vehicle 12 with a trailer 14 so that the trailer 14 can be hitched to the vehicle 12. As shown in FIG. 1, the vehicle 12 is exemplarily embodied as a pickup truck having a truck bed 16 that is accessible via a fold down tailgate 18. The vehicle 12 also includes a vehicle hitch connector in the form of a drawbar 22 that extends from the rear of the vehicle 12 and terminates in a hitch ball 24. The hitch ball 24 is configured to be received by a trailer hitch connector in the form of a coupler ball socket 26 that is provided at a terminal end of a tongue 28 of the trailer 14. The trailer 14 is exemplarily embodied as a single axle trailer having a box frame 30 with an enclosed cargo area 32 from which the tongue 28 extends longitudinally. A power tongue jack 36 is mounted to the tongue 28 and is automatically operated to raise the tongue 28 to provide sufficient clearance for the hitch ball 24. The power tongue jack 36 may include its own power source or be electrically connected to a power source of the vehicle 12. Alternatively, a manually operated tongue jack may be employed in other embodiments.

According to one embodiment, the power tongue jack 36 may be communicatively coupled to a controller 38 (FIG. 2) of the trailer backup assist system 10 in a wired or wireless (e.g., BLUETOOTH®) manner. In operation, the controller 38 may prompt the power tongue jack 36 to deploy or withdraw as needed in order for the vehicle 12 and trailer 14 to be hitched together or become unhitched. As will be described further herein, the hitching or unhitching of the vehicle 12 to and from the trailer 14 may be performed autonomously or semi-autonomously by the trailer backup assist system 10. To realize this, the controller 38 of the trailer backup assist system 10 may communicate with a number of vehicle equipment, which will be described further below.

Figure 3:
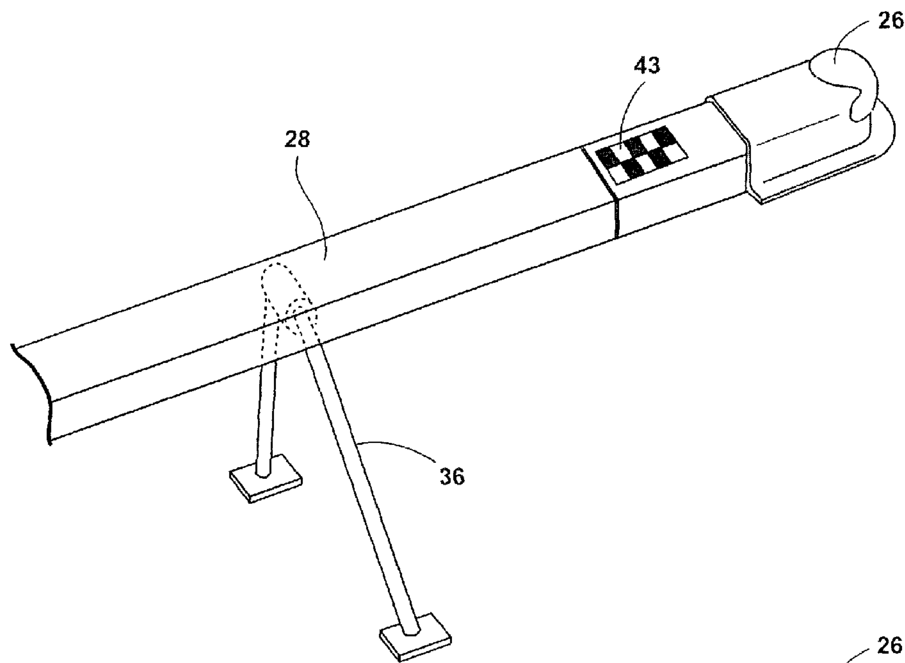
FIG. 3 illustrates a target on a tongue of the trailer.

In one embodiment, the controller 38 may communicate with an imaging device 40 located at the rear of the vehicle 12. The imaging device 40 may be centrally located at an upper region of the tailgate 18 such that the imaging device 40 is elevated relative to the drawbar 22 and the hitch ball 24. The imaging device 40 has a field of view 42 located and oriented to capture one or more images of a rear-vehicle scene that generally includes the hitch ball 24, among other things, when the vehicle 12 is not hitched to the trailer 14. Images captured by the imaging device 40 are processed by the controller 38 to identify a trailer hitch connection such as the coupler ball socket 26. In turn, the trailer backup assist system 10 is able to guide the vehicle 12 in a manner such that a hitch connection can be made between the vehicle 12 and the trailer 14. It is contemplated that the coupler ball socket 26 may be identified via imaging methods such as edge detection and the like. Alternatively, it is contemplated that the coupler ball socket 26 may be identified by using the imaging device 40 to track a target 43 (FIG. 3) provided on the tongue 28 and located on or proximate the coupler ball socket 26. As shown in FIG. 3, the target 43 may be positioned on the tongue 28 of the trailer 14 and include a pattern that is recognizable through image processing.

Figure 4:
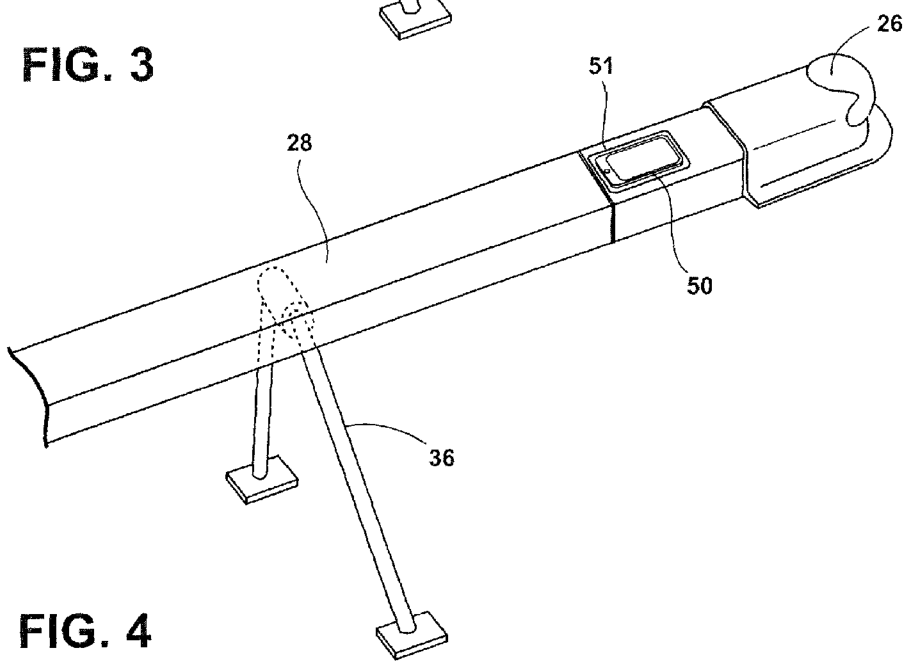
FIG. 4 illustrates a portable electronic device secured in a docking stating coupled to the tongue of the trailer.

In addition to communicating with the imaging device 40, the controller 38 may communicate with a number of proximity sensors, exemplarily shown as ultrasonic sensors 44 (FIG. 1), which are spaced across a lower region of the vehicle tailgate 18 and configured to detect the proximity or distance of objects located rearward of the vehicle 12. With reference to the embodiment of the trailer backup assist system 10 shown in FIG. 2, additional vehicle-related information may be provided to the controller 38 by a positioning device 46, such as a global positioning system (GPS) located on the vehicle 12. The positioning device 46 may additionally or alternatively include a dead reckoning system for determining the coordinate location of the vehicle 12 within a localized coordinate system based on vehicle dynamics such as vehicle speed and steering angle. Additionally, the controller 38 may communicate with an inertial system 47 including one or more gyroscopes 48 and accelerometers 49 to measure the position, orientation, direction, and/or speed of the vehicle 12. It is also contemplated that the controller 38 may communicate with a portable electronic device 50, such as a smartphone, located in the vehicle 12 or on the trailer 14, and from which vehicle or trailer-related information may be obtained. For example, in one embodiment, the portable electronic device 50 may be secured to a docking station 51 (FIG. 4) provided on the tongue 28 of the trailer 14 located on or proximate the coupler ball socket 26. The portable electronic device 50 may be equipped with GPS in order to communicate the position of the coupler ball socket 26 to the controller 38. In this manner, the portable electronic device 50 functions as an active target that transmits the position of coupler ball socket 26 to the controller 38.

To effectuate autonomous control of the vehicle 12, the controller 38 of trailer backup assist system 10 may be further configured to communicate with a variety of vehicle equipment. According to one embodiment, the controller 38 of the trailer backup assist system 10 may control a power assist steering system 52 of the vehicle 12 to operate the steered wheels 53 (FIG. 1) of the vehicle 12 while the vehicle 12 is backed toward the trailer 14. In instances where the trailer 14 is hitched to the vehicle 12, the controller 38 may control the power assist steering system 52 in such a manner that the trailer 14 is backed along a desired backing path. The power assist steering system 52 may be an electric power-assisted steering (EPAS) system that includes an electric steering motor 54 for turning the steered wheels 53 to a steering angle based on a steering command generated by the controller 38, whereby the steering angle may be sensed by a steering angle sensor 56 of the power assist steering system 52 and provided to the controller 38. As described herein, the steering command may be provided for autonomously steering the vehicle 12 during a backup maneuver and may alternatively be provided manually via a rotational position (e.g., a steering wheel angle) of a steering wheel 58 or a steering input device 60, which may be provided to enable a driver to control or otherwise modify the desired curvature of the backing path of vehicle 12. The steering input device 60 may be communicatively coupled to the controller 38 in a wired or wireless manner and provides the controller 38 with information defining the desired curvature of the backing path of the vehicle 12. In response, the controller 38 processes the information and generates corresponding steering commands that are supplied to the power assist steering system 52 of the vehicle 12. In one embodiment, the steering input device 60 includes a rotatable knob 62 operable between a number of rotated positions that each provide an incremental change to the desired curvature of the backing path of the vehicle 12.

In some embodiments, the steering wheel 58 of the vehicle 12 may be mechanically coupled with the steered wheels 53 of the vehicle 12, such that the steering wheel 58 moves in concert with steered wheels 53 via an internal torque, thereby preventing manual intervention with the steering wheel 58 during autonomous steering of the vehicle 12. In such instances, the power assist steering system 52 may include a torque sensor 64 that senses torque (e.g., gripping and/or turning) on the steering wheel 58 that is not expected from autonomous control of the steering wheel 58 and therefore indicative of manual intervention by the driver. In some embodiments, external torque applied to the steering wheel 58 may serve as a signal to the controller 38 that the driver has taken manual control and for the trailer backup assist system 10 to discontinue autonomous steering functionality.

With continued reference to FIG. 2, the controller 38 of the trailer backup assist system 10 may also communicate with a vehicle brake control system 66 of the vehicle 12 to receive vehicle speed information such as individual wheel speeds of the vehicle 12. Additionally or alternatively, vehicle speed information may be provided to the controller 38 by a powertrain control system 68 and/or a vehicle speed sensor 70, among other conceivable means. In some embodiments, the controller 38 may provide braking commands to the vehicle brake control system 66, thereby allowing the trailer backup assist system 10 to regulate the speed of the vehicle 12 during a backup maneuver of the vehicle 12. It should be appreciated that the controller 38 may additionally or alternatively regulate the speed of the vehicle 12 via interaction with the powertrain control system 68. In some embodiments, the vehicle 12 may be equipped with an adjustable suspension system 71 capable of raising and lowering the vehicle 12. For vehicles equipped with such functionality, it is contemplated that the controller 38 may communicate with the suspension system 71 to control the height of the vehicle 12 to allow the vehicle 12 to be hitched to or unhitched from the trailer 14.

Through interaction with the power assist steering system 52, the vehicle brake control system 66, and/or the powertrain control system 68 of the vehicle 12, the potential for unacceptable backup conditions can be reduced when the vehicle 12 is backing alone or with the trailer 14. Examples of unacceptable trailer backup conditions include, but are not limited to, a vehicle over-speed condition, a high hitch angle rate, hitch angle dynamic instability, a trailer jackknife condition, sensor failure, and the like. In such circumstances, the driver may be unaware of the failure until the unacceptable trailer backup condition is imminent or already happening. Therefore, it is disclosed herein that the controller 38 of the trailer backup assist system 10 can generate an alert signal corresponding to a notification of an actual, impending, and/or anticipated unacceptable backup condition, and prior to driver intervention, generate a counter measure to prevent such an unacceptable trailer backup condition.

According to one embodiment, the controller 38 may communicate with one or more devices, including a vehicle alert system 72, which may prompt visual, auditory, and tactile warnings. For instance, vehicle brake lights 74 and vehicle emergency flashers may provide a visual alert and a vehicle horn 76 and/or speaker 78 may provide an audible alert. Additionally, the controller 38 and/or vehicle alert system 72 may communicate with a human machine interface (HMI) 80 of the vehicle 12. The HMI 80 may include a touchscreen vehicle display 82 (FIG. 1) such as a center-stack mounted navigation or entertainment display capable of displaying images indicating the alert. Such an embodiment may be desirable to notify the driver of the vehicle 12 that an unacceptable backup condition is present.

With further reference to FIG. 2, the controller 38 is configured with a microprocessor 84 and/or other analog and/or digital circuitry for processing one or more logic routines stored in a memory 86. The logic routines may include one or more operating routines 88. Information from the imaging device 40 or other components of the trailer backup assist system 10 can be supplied to the controller 38 via a communication network of the vehicle 12, which can include a controller area network (CAN), a local interconnect network (LIN), or other conventional protocols used in the automotive industry. It should be appreciated that the controller 38 may be a stand-alone dedicated controller or may be a shared controller integrated with the imaging device 40 or other component of the trailer backup assist system 10 in addition to any other conceivable onboard or off-board vehicle control systems.

Figure 5:
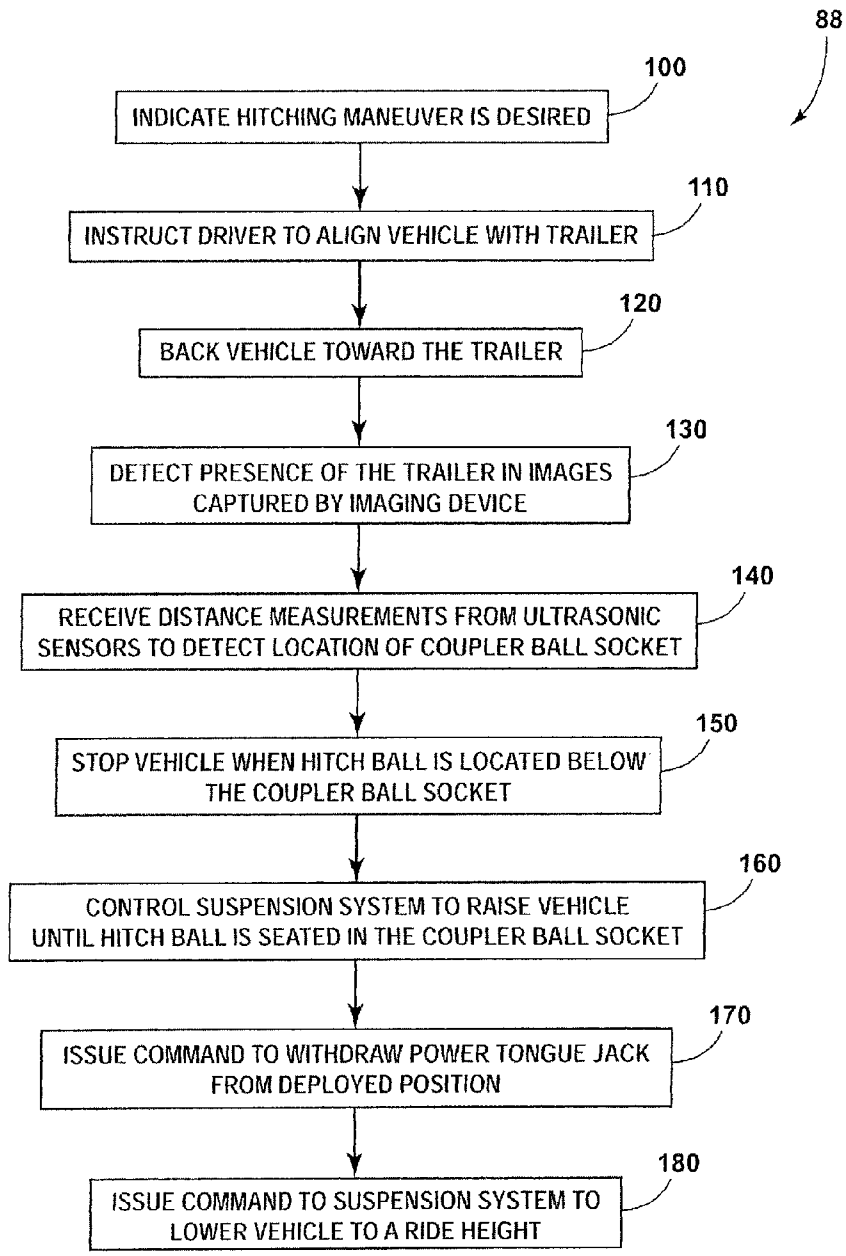
FIG. 5 is a flow diagram of a method for hitching the vehicle to the trailer.
Figure 6:
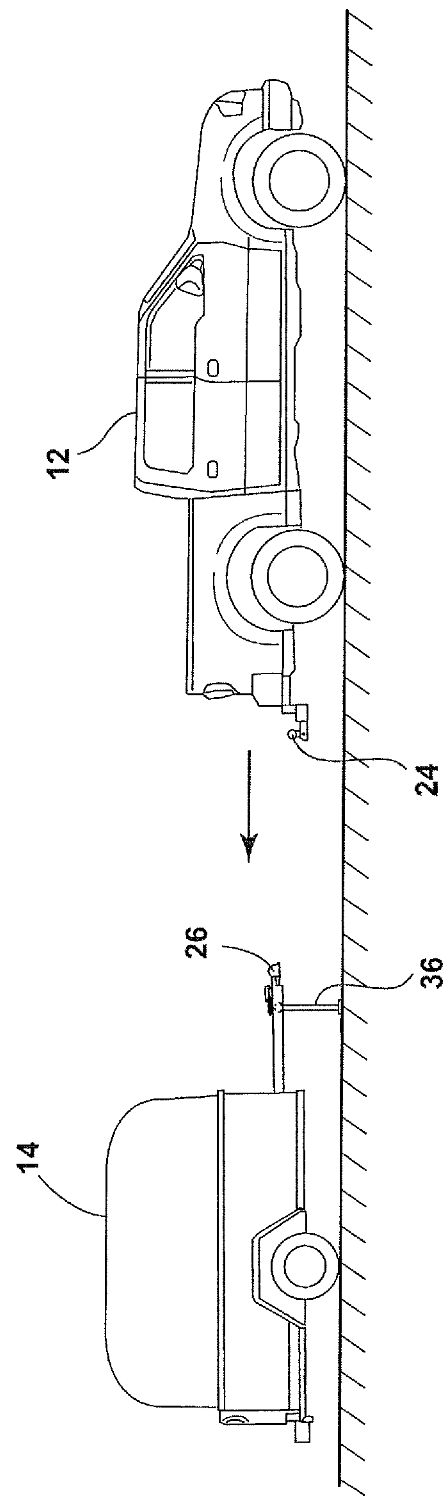
FIG. 6 illustrates the vehicle being backed toward the trailer, wherein a power tongue jack of the trailer is in a deployed position such that a coupler ball socket is elevated to provide sufficient clearance for a hitch ball.

Referring to FIG. 5, a flow diagram of a method of hitching the vehicle 12 to the trailer 14 is shown. The method is shown as one embodiment of the operating routine 88 and is executed by the controller 38 of the trailer backup assist system 10. For purposes of illustration, certain steps of the method will be described with reference to FIGS. 6 and 7. In describing the method, it is assumed that the trailer 14 is a new a trailer, or in other words, the vehicle 12 is being hitched to the trailer 14 for the first time. At step 100, the driver indicates to the trailer backup assist system 10 that a hitching maneuver is desired. This may be done by inputting commands via the display 82 of the HMI 80 or other use-input device of the vehicle 12. At step 110, the driver is instructed to back the vehicle 12 toward the trailer 14 until the vehicle 12 and the trailer 14 are in substantial alignment longitudinally. The instructions may be visual, appearing on the display 82, and/or auditory. Making sure that the trailer 14 is behind the vehicle 12 enables images of the trailer 14 to be captured by the imaging device 40 as well as distance measurements to be taken by the ultrasonic sensors 44. The vehicle 12 is generally shown in front of the trailer 14 in FIG. 6. As shown, the power tongue jack 36 is in a deployed position such that the coupler ball socket 26 is elevated to provide sufficient clearance for the hitch ball 24.

Figure 7:
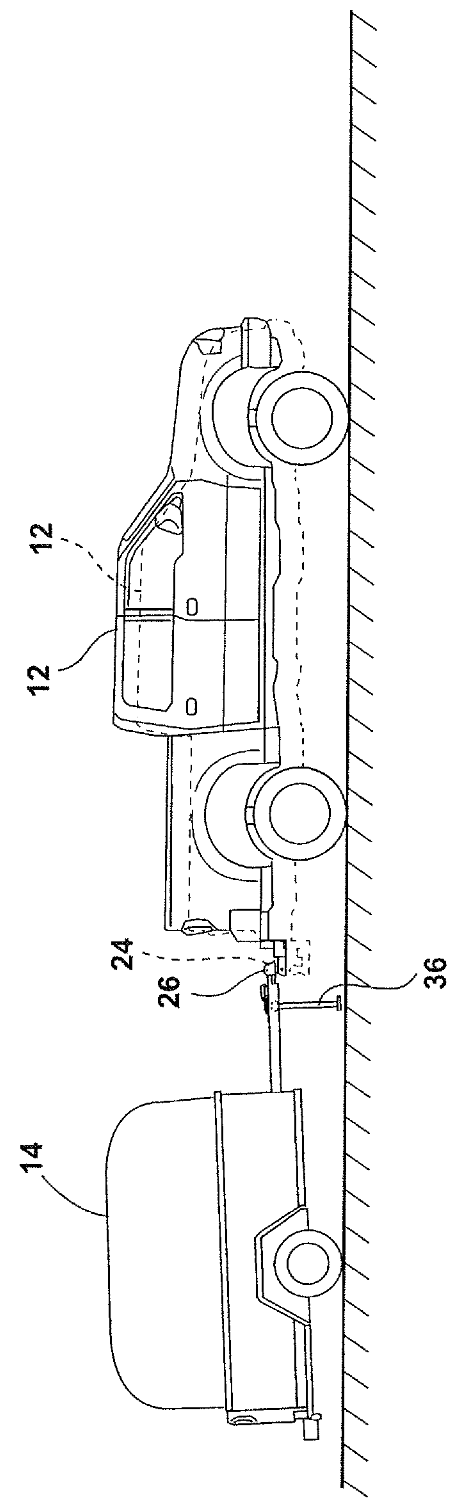
FIG. 7 illustrates the vehicle being raised so that the hitch ball is seated in the coupler ball socket.

Next, at step 120, the vehicle 12 is backed toward the trailer 14. According to one embodiment, the backing of the vehicle 12 may be done autonomously or semi-autonomously by the controller 38 through the control of the power assist steering system 52, the vehicle brake control system 66, and/or the powertrain control system 68 of the vehicle 12. In instances where the backing of the vehicle 12 is semi-autonomous, it is contemplated that the driver may be instructed to perform the requisite actions such that the vehicle 12 can be backed toward the trailer 14. As the vehicle 12 is being backed toward the trailer 14, the controller 38 detects the presence of the trailer 14 in images captured by the imaging device 40 at step 130. In so doing, the controller 38 is able to locate the coupler ball socket 26 and output steering commands to the power assist steering system 52 such that the drawbar 22 of the vehicle 12 maintains proper alignment with the coupler ball socket 26. At the same time, the controller 38 may receive distance measurements from the ultrasonic sensors 44 to detect the location of the coupler ball socket 26 relative to the vehicle 12 at step 140. Based on the processing of the images, distance measurements received from the ultrasonic sensors 44, and the known length of the drawbar 22, the vehicle 12 is stopped when the hitch ball 24 is located below the coupler ball socket 26 at step 150. At step 160, the controller 38 controls the suspension system 71 of the vehicle 12 to raise the vehicle 12 until the hitch ball 24 is seated in the coupler ball socket 26, as shown in FIG. 7. Once the hitch ball 24 is seated in the coupler ball socket 26, the controller 38 may issue a command to the power tongue jack 36 to withdraw from the deployed position at step 170. Alternatively, the power tongue jack 36 may be manually withdrawn from the deployed position. Next, at step 180, the controller 38 issues a command to the suspension system 71 to lower the vehicle 12 to a ride height for driving, at which point the driver is free to drive off with the trailer 14 in tow.

Figure 8:
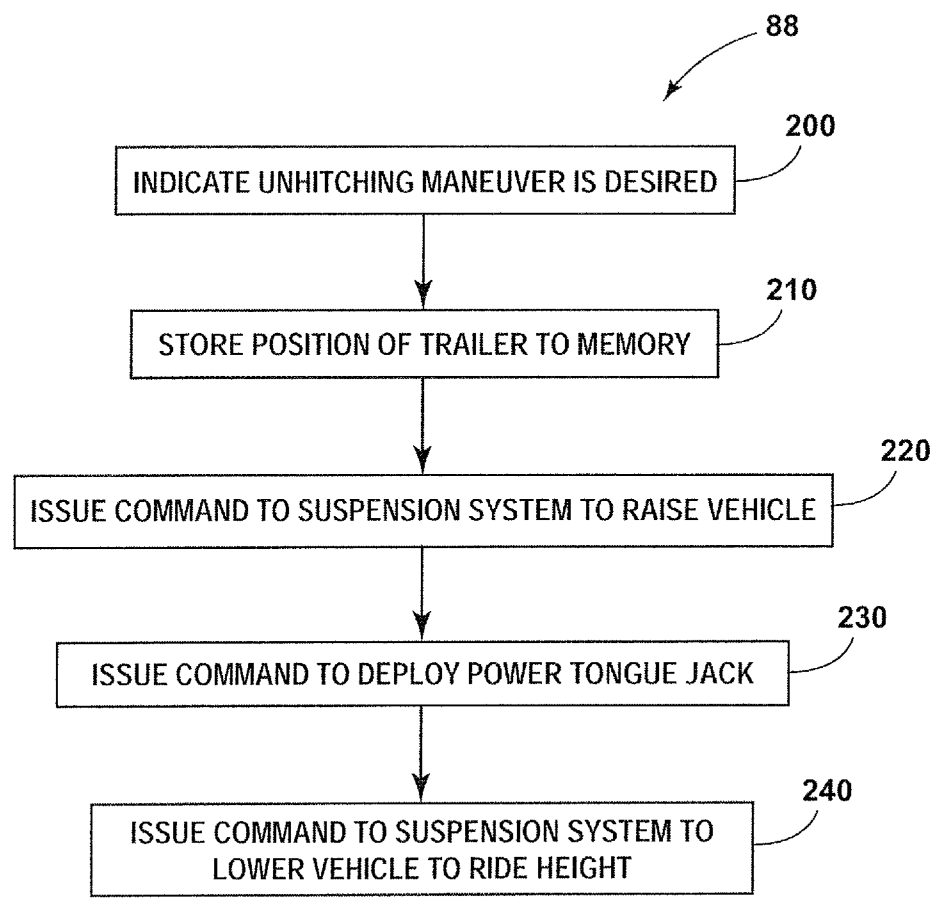
FIG. 8 is a flow diagram of a method for unhitching the vehicle from the trailer.
Figure 9:
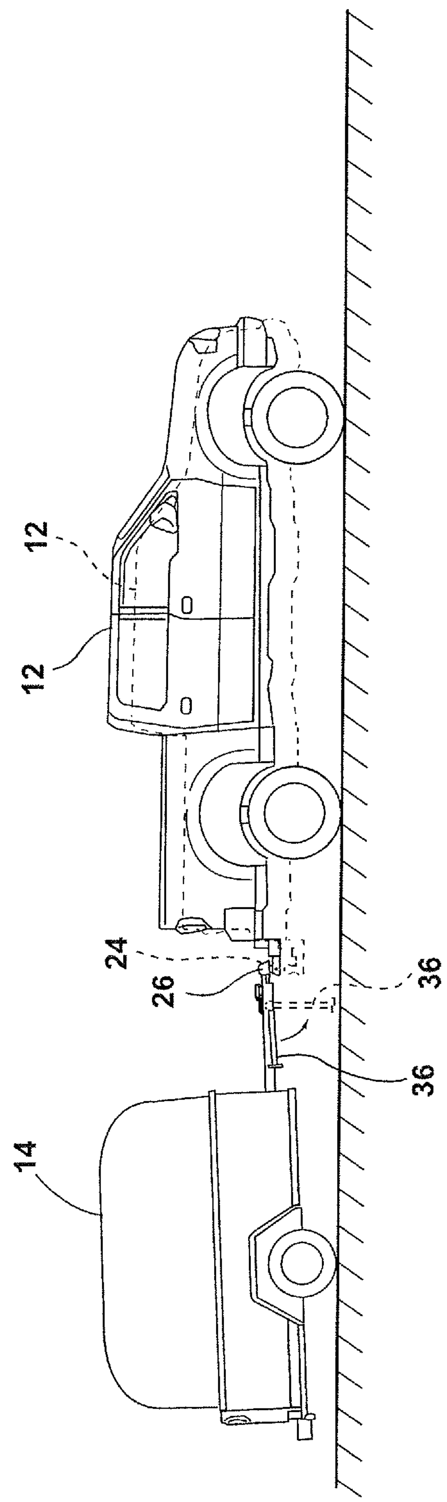
FIG. 9 illustrates the vehicle being raised to provide sufficient clearance for the deployment of the power tongue jack.

Referring to FIG. 8, a flow diagram of a method of unhitching the vehicle 12 to the trailer 14 is shown. The method is shown as one embodiment of the operating routine 88 and is executed by the controller 38 of the trailer backup assist system 10. For purposes of illustration, certain steps of the method will be described with reference to FIGS. 9 and 10. In describing the method, it is assumed that trailer 14 is in a final parking position and the driver now intends on unhitching the vehicle 12 from the trailer 14. At step 200 the driver indicates to the trailer backup assist system 10 that an unhitching maneuver is desired. This may be done by inputting commands via the display 82 of the HMI 80 or other use-input device of the vehicle 12. Having indicated that an unhitching maneuver is desired, the controller 38 stores the position of the vehicle 12 to memory 86 at step 210. The stored position may include a GPS coordinate position of the vehicle 12 received from the positioning device 46 along with inertial information of the vehicle 12 as measured by the inertial system 47 of the vehicle 12. At step 220, the controller 38 issues a command to the suspension system 71 to raise the vehicle 12, as shown in FIG. 9, thereby providing sufficient clearance for the deployment of the power tongue jack 36. At step 230, the controller issues a command to the power tongue jack 36 to deploy. Alternatively, deployment of the power tongue jack 36 may be performed manually. At step 240, the controller 38 issues a command to the suspension system 71 to lower the vehicle

Figure 10:
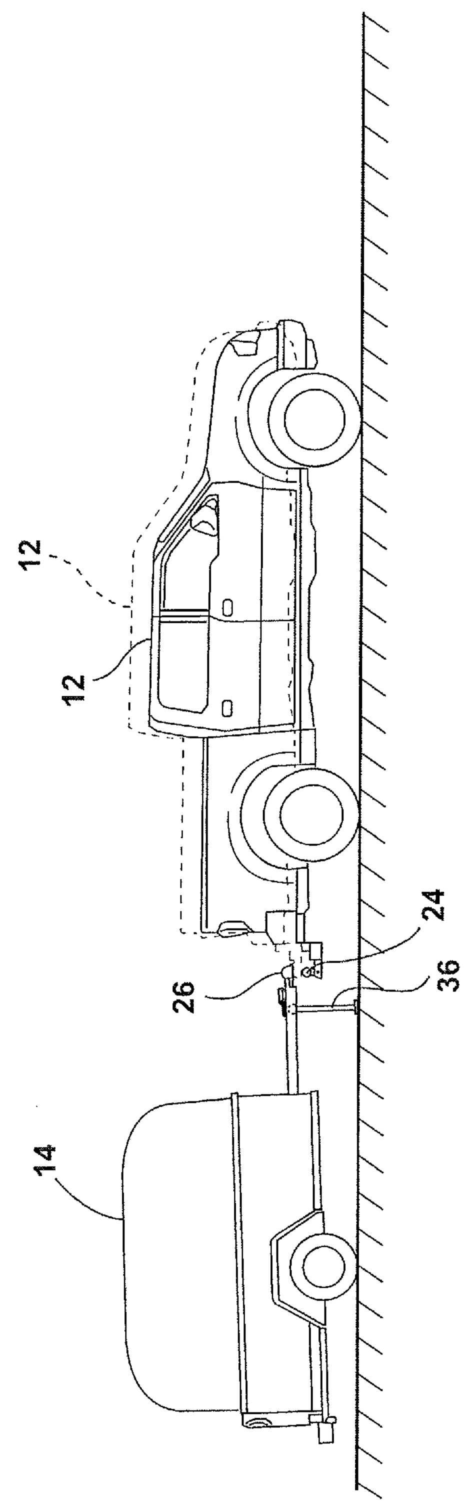
FIG. 10 illustrates the vehicle being lowered to a ride height once the power tongue jack has been deployed.

12 to the ride height once the power tongue jack 36 has been deployed, as shown in FIG. 10. During the lowering process, the power tongue jack 36 catches the ground, thereby causing the hitch ball 24 to become unseated from the coupler ball socket 26. Once the vehicle 12 reaches the ride height, the driver is free to drive away from the trailer 14.

When it is desired to hitch the vehicle 12 to the trailer 14 at a later time, the trailer backup assist system 10 may autonomously or semi-autonomously control the vehicle 12 to position the vehicle 12 according to the stored position saved previously to memory 86 at step 210, thereby ensuring that the hitch ball 24 is located below the coupler ball socket 26 of the trailer 14. The vehicle 12 can then be hitched to the trailer 14 pursuant to steps 150-170 as outlined in the method described with reference to FIG. 5. It should be appreciated that multiple stored positions of the trailer 14 can be saved to memory 86, each associated with multiple trailers. In this manner, when the driver desires to hitch the vehicle 12 to a specific trailer, the driver need simply recall the corresponding stored position of the vehicle 12. In turn, the trailer backup assist system 10 guides the vehicle 12 to the stored position so that the vehicle 12 can be hitched to the trailer 14. The stored position(s) may be accessed through one or more menus displayed on the display 82 of the vehicle 12.

It is to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A hitch assist system comprising:
- an imaging device for capturing images of a scene rearward of a vehicle;
- a controller for processing captured images, the controller further configured to:
  - control a vehicle suspension system to adjust a height of the vehicle; and
  - control the deployment of a power tongue jack of a trailer.

2. The hitch assist system of claim 1, further comprising ultrasonic sensors for distance measurement of objects located behind the vehicle.

3. The hitch assist system of claim 1, wherein the controller processes captured images to determine the location of a coupler ball socket of the trailer.

4. The hitch assist system of claim 1, wherein the controller issues commands for autonomously backing the vehicle toward the trailer.

5. The hitch assist system of claim 1, wherein the controller determines the location of a coupler ball socket of the trailer based on information received from a portable electronic device located on a tongue of the trailer.

6. The hitch assist system of claim 1, further comprising a positioning device and an inertial system for measuring vehicle-related information including at least one of a vehicle position and a vehicle orientation, wherein when the vehicle-related information is stored to a memory of the controller.

7. The hitch assist system of claim 6, wherein the vehicle-related information is used to guide the vehicle in a backing maneuver toward the trailer such that a hitch ball of the vehicle is aligned with a coupler ball socket of the trailer.

8. A method of hitching a vehicle to a trailer, comprising the steps of:
- providing a controller configured to:
  - autonomously back the vehicle toward the trailer;
  - control a vehicle suspension system to adjust a height of the vehicle such that a hitch connection can be made between a hitch ball and a coupler ball socket; and
  - control a power tongue jack of the trailer to move between a deployed position and a retracted position.

9. The method of claim 8, wherein the controller is further configured to process images captured by an imaging device to determine the location of the coupler ball socket.

10. The method of claim 8, further comprising the step of using ultrasonic sensors to determine a distance of the coupler ball socket relative to the vehicle.

11. The method of claim 8, wherein the vehicle is backed toward the trailer until the hitch ball is positioned below the coupler ball socket.

12. The method of claim 11, wherein the controller issues a command to the suspension system to raise the vehicle such that the hitch ball is seated in the coupler ball socket.

13. The method of claim 12, wherein the controller issues a command to the power tongue jack to retract from the deployed position.

14. The method of claim 13, wherein controller issues a command to the suspension system to lower the vehicle to a ride height.

* * * * *